United States Patent
Shi (10) Patent No.: US 11,051,338 B2
(45) Date of Patent: Jun. 29, 2021

(54) CHANNEL ACCESS METHOD AND APPARATUS FOR PHYSICAL RANDOM ACCESS CHANNEL TRANSMISSION, AND PROGRAM

(71) Applicant: GUANGDONG OPPO MOBILE TELECOMMUNICATIONS CORP., LTD., Dongguan (CN)

(72) Inventor: Cong Shi, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/012,615

(22) Filed: Sep. 4, 2020

(65) Prior Publication Data

US 2020/0413444 A1 Dec. 31, 2020

Related U.S. Application Data

(63) Continuation of application No. PCT/CN2019/008136, filed on May 23, 2019.

(30) Foreign Application Priority Data

Jun. 20, 2018 (CN) .......................... 201810639666.X (51) Int. Cl.
*H04W 4/00* (2018.01)
*H04W 74/08* (2009.01)
(Continued)

(52) U.S. Cl.
CPC ....... *H04W 74/0808* (2013.01); *H04W 16/14* (2013.01); *H04W 72/0446* (2013.01); *H04W 74/02* (2013.01)

(58) Field of Classification Search
CPC ............ H04W 74/0808; H04W 16/14; H04W 72/0446
See application file for complete search history.

(56) References Cited

U.S. PATENT DOCUMENTS

| 2012/0051251 | A1 | 3/2012 | Seo et al. | |
| 2019/0313451 | A1* | 10/2019 | Liu | H04W 74/0808 |
| 2019/0342915 | A1* | 11/2019 | Kim | H04W 72/0446 |

FOREIGN PATENT DOCUMENTS

| CN | 101005705 A | 7/2007 |
| CN | 103716895 A | 4/2014 |

(Continued)

OTHER PUBLICATIONS

"Potential solutions and techniques for NR unlicensed", Source: Nokia, Nokia Shanghai Bell, Agenda Item: 7.6.4, 3GPP TSG RAN WG1 Meeting #92, R1-1802526, Athens, Greece, Feb. 26-Mar. 2, 2018, 10 pages.

(Continued)

*Primary Examiner* — Siren Wei
(74) *Attorney, Agent, or Firm* — Bayes PLLC (57) ABSTRACT

Disclosed herein includes a channel access method and apparatus for physical random access channel (PRACH) transmission, and a program, which can improve system performance. The method may include determining, by a terminal device, a target channel access type, where the target channel access type is a channel access type used by the terminal device to transmit a PRACH on an unlicensed carrier, and determining, by the terminal device according to the target channel access type, whether a target time domain resource is available, where the target time domain resource is a time domain resource used by the terminal device to send the PRACH.

18 Claims, 3 Drawing Sheets

(51) Int. Cl.
H04W 16/14 (2009.01)
H04W 72/04 (2009.01)
H04W 74/02 (2009.01)

(56) References Cited

FOREIGN PATENT DOCUMENTS

| CN | 105532069 A | 4/2016 |
|---|---|---|
| CN | 105682232 A | 6/2016 |
| CN | 108882340 A | 11/2018 |
| WO | 2019242452 A1 | 12/2019 |

OTHER PUBLICATIONS

"DL/UL Time Resource Allocation", Agenda item: 6.13.3.1.2, Source: Samsung, 3GPP TSG RAN WG1 Meeting #90, R1-1713636, Prague, Czechia Aug. 21-25, 2017, 4 pages.
Supplemental European Search Report issued in corresponding European Application No. EP19822525.2, dated Jan. 25, 2021, 11 pages.

* cited by examiner

FIG. 1

```
┌─────────────────────────────────────────────────┐
│ A terminal device determines a target channel   │
│ access type, where the target channel access    │─── 201
│ type is a channel access type used by the       │
│ terminal device to transmit a PRACH on          │
│ an unlicensed carrier                           │
└─────────────────────────────────────────────────┘
                         │
                         ▼
┌─────────────────────────────────────────────────┐
│ The terminal device determines, according to    │
│ the target channel access type, whether a       │
│ target time domain resource is available, where │─── 202
│ the target time domain resource is a time       │
│ domain resource used by the terminal device to  │
│ send the PRACH                                  │
└─────────────────────────────────────────────────┘
```

CHANNEL ACCESS METHOD AND APPARATUS FOR PHYSICAL RANDOM ACCESS CHANNEL TRANSMISSION, AND PROGRAM

CROSS-REFERENCE TO RELATED APPLICATIONS

The present disclosure is a continuation of International Application No. PCT/CN2019/088136, filed on May 23, 2019, which claims the benefit of priority to Chinese Application No. 201810639666.X, filed on Jun. 20, 2018, both of which are incorporated by reference in their entireties.

BACKGROUND

Embodiments of the present disclosure relate to the field of wireless network technologies, and specifically, to a channel access method and apparatus for physical random access channel (PRACH) transmission, and a program.

An unlicensed spectrum is a spectrum allocated by a country or a region for radio device communication. The spectrum is generally considered as a shared spectrum. In other words, communications devices in different communications systems may use the spectrum without applying to a government for a dedicated spectrum license, as long as regulatory requirements set by the country or the region on the spectrum are met.

To enable communications systems using the unlicensed spectrum for wireless communication to friendly coexist on the spectrum, a communications device needs to follow a "listen before talk" rule. To be specific, the communications device usually needs to perform channel access (that is, channel detection) before sending a signal on a channel of the unlicensed spectrum. The communications device can send a signal only when a channel detection result is that the channel is idle. If the channel detection result of the communications device on the channel of the unlicensed spectrum is that the channel is busy, the communications device cannot send a signal.

When a new radio (NR) technology is applied to the unlicensed spectrum, because new radio-unlicensed (NR-U) supports a scenario of standalone (SA), a contention-based random access channel (CB-RACH) and a contention-free random access channel (CF-RACH) need to be considered to be sent on the unlicensed spectrum.

SUMMARY

Embodiments of the present disclosure provide a channel access method and apparatus for PRACH transmission, and a program.

According to a first aspect, a channel access method for PRACH transmission is provided, including determining, by a terminal device, a target channel access type, where the target channel access type is a channel access type used by the terminal device to transmit a PRACH on an unlicensed carrier; and determining, by the terminal device according to the target channel access type, whether a target time domain resource is available, where the target time domain resource is a time domain resource used by the terminal device to send the PRACH.

According to a second aspect, a channel access method for PRACH transmission is provided, including sending, by a network device, configuration information to a terminal device, so that the terminal device determines a target channel access type according to the configuration information, where the target channel access type is a channel access type used by the terminal device to transmit a PRACH on an unlicensed carrier.

According to a third aspect, a channel access method for PRACH transmission is provided, including sending, by a network device, first indication information to a terminal device by using physical layer signaling when a random access procedure corresponding to a PRACH is a contention-free random access procedure, so that the terminal device determines a target channel access type according to the first indication information, where the target channel access type is a channel access type used by the terminal device to transmit the PRACH on an unlicensed carrier.

According to a fourth aspect, a channel access apparatus for PRACH transmission is provided, configured to perform the method according to the first aspect or implementations of the first aspect.

Specifically, the channel access apparatus for PRACH transmission includes a function module configured to perform the method according to the first aspect or the implementations of the first aspect.

According to a fifth aspect, a channel access apparatus for PRACH transmission is provided, configured to perform the method according to the second aspect or implementations of the second aspect.

Specifically, the channel access apparatus for PRACH transmission includes a function module configured to perform the method according to the second aspect or the implementations of the second aspect.

According to a sixth aspect, a channel access apparatus for PRACH transmission is provided, configured to perform the method according to the third aspect or implementations of the third aspect.

Specifically, the channel access apparatus for PRACH transmission includes a function module configured to perform the method according to the third aspect or the implementations of the third aspect.

According to a seventh aspect, a communications device is provided, including a processor and a memory, where the memory is configured to store a computer program, and the processor is configured to invoke and run the computer program stored in the memory, to perform the method according to any one of the first to third aspects or implementations thereof.

According to an eighth aspect, a chip is provided, configured to perform the method according to any one of the first to third aspects or implementations thereof.

Specifically, the chip includes a processor, configured to invoke a computer program from a memory and run the computer program, to enable a device having the chip installed to perform the method according to any one of the first to third aspects or implementations thereof.

According to a ninth aspect, a computer-readable storage medium is provided, configured to store a computer program, where the computer program enables a computer to perform the method according to any one of the first to third aspects or implementations thereof.

According to a tenth aspect, a computer program product is provided, including a computer program instruction, where the computer program instruction enables a computer to perform the method according to any one of the first to third aspects or implementations thereof.

According to an eleventh aspect, a computer program is provided, where when the computer program is run on a computer, the computer is enabled to perform the method according to any one of the first to third aspects or implementations thereof

DETAILED DESCRIPTION

The technical solutions of the embodiments of the present disclosure will be described in the following with reference to the accompanying drawings. It is obvious that the embodiments to be described are some rather than all of the embodiments of the present disclosure. All other embodiments obtained by a person of ordinary skill in the art based on the embodiments of the present disclosure without creative efforts shall fall within the protection scope of the present disclosure.

The technical solutions of the embodiments of the present disclosure may be applied to different communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), worldwide interoperability for microwave access (WiMAX) communications system, or 5G system.

Figure 1:
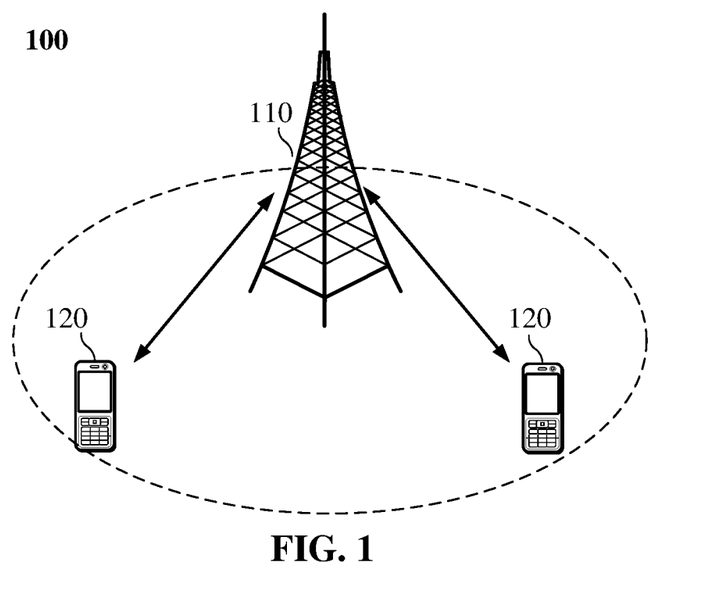
FIG. 1 is a schematic architectural diagram of a communications system according to an embodiment of the present disclosure.

For example, FIG. 1 shows a communications system 100 to which an embodiment of the present disclosure is applied. The communications system 100 may include a network device 110. The network device 110 may be a device communicating with a terminal device (or referred to as a communications terminal or a terminal) 120. The network device 110 may provide communication coverage for a particular geographical area and may communicate with a terminal device located within the coverage. Optionally, the network device 110 may be a base transceiver station (BTS) in a GSM system or a CDMA system, or may be a NodeB (NB) in a WCDMA system, or may be an evolved NodeB (eNB or eNodeB) in an LTE system, or a radio controller in a cloud radio access network (CRAN), or the network device may be a mobile switching center, a relay station, an access point, an in-vehicle device, a wearable device, a concentrator, a switch, a bridge, a router, a network-side device in a 5G network, a network device in a future evolved public land mobile network (PLMN), or the like.

The communications system 100 further includes at least one terminal device 120 located within the coverage of the network device 110. The "terminal device" used herein includes, but is not limited to, being connected through: a wired line, for example, through a public switched telephone network (PSTN), a digital subscriber line (DSL), a digital cable, or a direct cable; and/or another data connection/ network; and/or a radio interface, for example, for a cellular network, a wireless local area network (WLAN), a digital television network such as a DVB-H network, a satellite network, or an AM-FM broadcast transmitter; and/or an apparatus of another terminal device that is configured to receive/send communications signals; and/or an Internet of Things (IoT) device. A terminal device configured to communicate through a radio interface may be referred to as a "wireless communications terminal," a "wireless terminal," or a "mobile terminal." Examples of the mobile terminal include, but are not limited to, a satellite or a cellular phone; a personal communications system (PCS) terminal that may combine a cellular radio telephone with data processing, a fax, and a data communication capability; a PDA that may include a radio telephone, a pager, Internet/Intranet access, a Web browser, a notepad, a calendar, and/or a Global Positioning System (GPS) receiver; and a regular laptop and/or palmtop receiver or other electronic devices that include a radio telephone transceiver. The terminal device may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a 5G network, a terminal device in a future evolved PLMN, or the like.

Optionally, the terminal devices 120 may perform device-to-device (D2D) communication with each other.

Optionally, the 5G system or the 5G network may also be referred to as an NR system or an NR network.

The technical solutions of the embodiments of the present disclosure may be applied to an unlicensed spectrum and may also be applied to a licensed spectrum. This is not limited to the embodiments of the present disclosure.

FIG. 1 shows one network device and two terminal devices as an example. Optionally, the communications system 100 may include a plurality of network devices, and each network device may cover another quantity of terminal devices. This is not limited to this embodiment of the present disclosure.

Optionally, the communications system 100 may further include other network entities such as a network controller and a mobility management entity (MME). This is not limited to this embodiment of the present disclosure.

It should be understood that a device having a communication function in a network/system in this embodiment of the present disclosure may be referred to as a communications device. For example, in the communications system 100 shown in FIG. 1, communications devices may include the network device 110 and the terminal device 120 having a communication function. The network device 110 and the terminal device 120 may be specific devices described above, and details are not described herein again. The communications devices may further include other devices, for example, other network entities such as the network controller and the MME in the communications system 100. This is not limited to this embodiment of the present disclosure.

It should be understood that the terms "system" and "network" in this specification are usually interchangeably used in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

Figure 2:
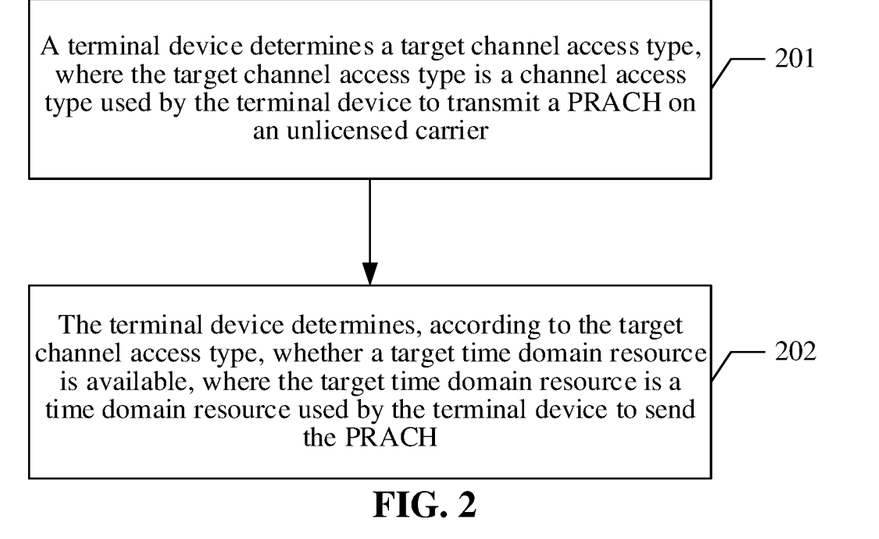
FIG. 2 is a schematic flowchart of a channel access method for PRACH transmission according to an embodiment of the present disclosure.

FIG. 2 is a schematic flowchart of a channel access method for PRACH transmission according to an embodiment of the present disclosure. As shown in FIG. 2, the method includes the following specific implementation.

In 201, a terminal device determines a target channel access type, where the target channel access type is a channel access type used by the terminal device to transmit a PRACH on an unlicensed carrier.

In 202, the terminal device determines, according to the target channel access type, whether a target time domain resource is available, where the target time domain resource is a time domain resource used by the terminal device to send the PRACH.

It should be understood that the channel access type may include a type1 channel access type and a type2 channel access type.

The type1 channel access type is contention window-based channel detection. The type1 channel access type includes at least two channel access priorities, and the terminal device may perform channel detection according to channel access parameters corresponding to different priorities. A higher channel access priority generally indicates that a channel access time is shorter, but to ensure fairness of spectrum utilization on the unlicensed spectrum, a channel occupation time is also shorter. Correspondingly, a lower channel access priority generally indicates that the channel access time is longer, but to ensure fairness of spectrum utilization on the unlicensed spectrum, the channel occupation time is also longer.

As an example, but not for limitation, the channel access parameters corresponding to the different channel access priorities may be as follows:

TABLE 1

Channel access parameters corresponding to different channel access priorities

| Channel access priority (p) | $m_p$ | $CW_{min,p}$ | $CW_{max,p}$ | $T_{ulm\ cot,p}$ | Allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

For p=3,4, $T_{ulm\ cot,p}$=10 ms if a higher layer parameter 'absenceOfAnyOtherTechnology-r14' indicates TRUE; otherwise, $T_{ulm\ cot,p}$=6 ms.

In addition, when $T_{ulm\ cot,p}$=6 ms, it may be increased to 8 ms by inserting one or more gaps. The minimum duration of a gap shall be 100 us. The maximum duration before any such gap is included shall be 6 ms.

In Table 1, a smaller value of P indicates a higher channel access priority. For example, a channel access priority of P=1 is higher than a channel access priority of P=2.

Specifically, specific steps performed by the terminal in channel detection according to the channel access parameters may include:

(1) setting a counter $N=N_{init}$, where $N_{init}$ is a random number uniformly distributed between 0 to CWp;

(2) if N>0, subtracting 1 from the counter, that is, N=N−1;

(3) performing clear channel assessment (CCA) slot detection with a length of $T_{sl}$ (a length of $T_{sl}$ is 9 microsecond, that is, a length of a CCA slot is 9 microsecond) on a channel, if the CCA slot is idle, ending a channel access procedure; otherwise, performing (4);

(4) performing CCA slot detection on a channel with a time length of $T_d$ ($T_d$=16+$m_p$*9 (microsecond)), a detection result is either that at least one CCA slot is occupied or that all CCA slots are idle; and (5) if all the CCA slots are idle in the time $T_d$, ending the channel access procedure; otherwise, performing (4).

An initial value of CWp is CWmin,p, and CWp may be adjusted between CWmin,p and CWmax,p according to a specific condition (for example, the transmission fails).

The type2 channel access type is single slot-based channel detection. As an example but not for limitation, a type2 channel access procedure includes: performing, by the terminal device before transmission, CCA slot detection with a length of 25 microseconds on the unlicensed spectrum, that is, performing 25-microsecond single slot channel detection. If the channel is idle, it may be considered that the channel access is successful. If the channel is occupied, it may be considered that the channel access fails.

It should be understood that a priority of the type2 channel access type may be generally considered to be higher than that of the type1 channel access type with the highest priority (for example, the channel access type of P=1 in Table 1).

In this embodiment of the present disclosure, the terminal device may determine the target channel access type according to at least one of the following manners.

Manner 1:

The terminal device determines the target channel access type according to a standard specification. In other words, the target channel access type used by the terminal device to transmit the PRACH may be directly stipulated in the standard specification.

Optionally, the target channel access type may include at least one of a type1 channel access type with the highest priority, a type2 channel access type, a type1 channel access type with the highest priority with directional channel access, a type2 directional channel access type, and bypassing channel detection. It should be understood that a directional channel access type may refer to performing channel detection in a specific direction. For example, the type2 directional channel access type may be as follows: The terminal device performs, before transmission, CCA slot detection with a length of 25 microseconds in a specific direction of the unlicensed spectrum, that is, 25-microsecond single slot channel detection. If the channel is idle, it may be considered that the channel access is successful. If the channel is occupied, it may be considered that the channel access fails.

It should be understood that a non-directional channel access type refers to an omni-direction channel access type.

It should be further understood that the bypassing channel detection refers to that the terminal device may send the PRACH in the target time domain resource without channel detection Manner 2:

The terminal device determines the target channel access type according to a configuration by a network device.

Before the terminal device sends the PRACH, the network device may first configure some prior information for the terminal device, for example, the PRACH is sent in which time domain resources. In addition, the network device may further configure the target channel access type for the terminal device.

Optionally, the target channel access type may include at least one of a type1 channel access type with the highest priority, a type2 channel access type, a type1 channel access type with the highest priority with directional channel access, a type2 directional channel access type, and bypassing channel detection.

Manner 3:

The terminal device determines the target channel access type according to the target time domain resource.

Optionally, the terminal device may determine the target channel access type according to whether the target time domain resource belongs to a shared channel occupancy time (shared COT).

The target channel access type may include at least one of a type1 channel access type with the highest priority, a type2 channel access type, a type1 channel access type with the highest priority with directional channel access, a type2 directional channel access type, and bypassing channel detection.

For example, if the terminal device determines that the target time domain resource belongs to the shared COT, the type2 channel access type may be used as the target channel access type; otherwise, the type1 channel access type with the highest priority may be used as the target channel access type. For another example, if the terminal device determines that the target time domain resource belongs to the shared COT, channel detection may not be performed; otherwise, the type2 channel access type may be used as the target channel access type.

For another example, if the terminal device determines that the target time domain resource belongs to an AUL-shared COT, channel detection may not be performed. If the terminal device determines that the target time domain resource belongs to a shared COT shared by a network device with the terminal device, the type2 channel access type may be used as the target channel access type; otherwise, the type1 channel access type with the highest priority may be used as the target channel access type.

Optionally, the shared COT may be a COT shared by the network device with the terminal device or may be a COT shared by autonomous uplink (UL) transmission of the terminal device with the target time domain resource.

Optionally, the shared COT shared by the network device with the terminal device may refer to that the target time domain resource used by the terminal device to transmit the PRACH belongs to a resource in a downlink (DL) transmission opportunity of the network device.

Optionally, the shared COT shared by the autonomous UL transmission of the terminal device with the target time domain resource may refer to that the target time domain resource used by the terminal device to transmit the PRACH belongs to a resource in an autonomous UL transmission opportunity of the terminal device.

Manner 4:

The terminal device determines the target channel access type according to a priority of a service triggering the PRACH to be sent, where the target channel access type is one of at least two candidate channel access types, and the at least two candidate channel access types correspond to the priority of the service triggering the PRACH to be sent.

The service triggering the PRACH to be sent may include at least one of the following:

initial access from RRC_IDLE;

RRC connection re-establishment procedure;

DL or UL data arrival during RRC_CONNECTED when UL synchronization status is "non-synchronized";

transition from RRC_INACTIVE;

request for other system information (SI);

handover; and beam failure recovery.

The at least two candidate channel access types correspond to the priority of the service triggering the PRACH to be sent. In addition, a correspondence between the at least two candidate channel access types and the priority of the service triggering the PRACH to be sent is stipulated in a standard specification or is configured by a network device.

Optionally, each service may correspond to a channel access priority.

Optionally, the handover service corresponds to the highest channel access priority. The correspondence may be a one-to-one correspondence or may not be a one-to-one correspondence. For example, when the service triggering the PRACH to be sent is the handover service, the target channel access type is the channel access type with the highest priority (for example, the type2 channel access type) in the at least two candidate channel access types. For another example, when the service triggering the PRACH to be sent is not the handover service (that is, other services than the handover service), the target channel access type is the type1 channel access type with the highest priority.

The network device may configure the correspondence by using radio resource control signaling or the like.

The at least two candidate channel access types may include at least one of a type1 channel access type with the highest priority, a type2 channel access type, a type1 channel access type with the highest priority with directional channel access, a type2 directional channel access type, and bypassing channel detection.

Anyway, after determining the target channel access type, the terminal device may determine, according to the target channel access type, whether the target time domain resource is available. The target time domain resource is a time domain resource used by the terminal device to send the PRACH.

If the target channel access type is the bypassing channel detection, it may be directly considered that the target time domain resource is available. Otherwise, the terminal device may perform channel detection according to the target channel access type to determine whether the target time domain resource is available according to the target channel access type, that is, channel detection is performed on the unlicensed carrier. If the target time domain resource is available, the PRACH may be sent in the target time domain resource. If the target time domain resource is unavailable, the PRACH is not sent in the target time domain resource.

In this embodiment, a random access procedure corresponding to the PRACH may be a contention-based random access procedure, that is, a CB-RACH procedure, or may be a contention-free random access procedure, that is, a CF-RACH procedure.

Manners of determining the target channel access type by the terminal device described in the manner 1 to the manner 4 may be applicable to both the contention-based random access procedure and the contention-free random access procedure.

In addition, the terminal device may alternatively determine the target channel access type according to the random access procedure corresponding to the PRACH, where the random access procedure includes the contention-based random access procedure and the contention-free random access procedure.

When the random access procedure corresponding to the PRACH is the contention-free random access procedure, the terminal device may determine the target channel access type according to the first indication information, where the first indication information is sent to the terminal device by a network device by using physical layer signaling.

The first indication information may directly indicate the target channel access type, or may indicate a service priority or the like, so that the terminal device determines the target channel access type according to the service priority or the like, or may indicate a channel access priority or the like, so that the terminal device determines, according to the channel access priority or the like, a channel access parameter corresponding to the target channel access type.

In addition, the target channel access type indicated by the first indication information may be determined by the network device according to a priority of a service triggering the PRACH to be sent, or according to whether the target time domain resource belongs to a shared COT.

The first indication information may be further used for determining at least one of the following information: a start location of the PRACH, an end location of the PRACH, a transmit beam identifier corresponding to the PRACH, and a receive beam identifier corresponding to the PRACH, in addition to indicating the target channel access type and the like.

Optionally, the transmit beam identifier corresponding to the PRACH and/or the receive beam identifier corresponding to the PRACH are/is determined according to a beam direction of a synchronization signal block (SSB) associated with a PRACH resource (for example, the target time domain resource). The SSB includes A primary synchronization signal (PSS), a secondary synchronization signal (SSS), and a physical broadcast channel (PBCH). When the random access procedure corresponding to the PRACH is the contention-based random access procedure, the terminal device may determine the target channel access type in the following manner: determining the target channel access type according to a standard specification, or determining the target channel access type according to the a configuration by a network device, or determining the target channel access type according to the target time domain resource.

The determining, by the terminal device, the target channel access type according to the target time domain resource may include: determining, by the terminal device, the target channel access type according to whether the target time domain resource belongs to a shared COT.

The target channel access type may include at least one of a type1 channel access type with the highest priority, a type2 channel access type, a type1 channel access type with the highest priority with directional channel access, a type2 directional channel access type, and bypassing channel detection.

In addition, the terminal device may alternatively determine the target channel access type in the following manner: determining, by the terminal device, the target channel access type according to a priority of a service triggering the PRACH to be sent, where the target channel access type is one of at least two candidate channel access types, and the at least two candidate channel access types correspond to the priority of the service triggering the PRACH to be sent.

The correspondence between the at least two candidate channel access types and the priority of the service triggering the PRACH to be sent is stipulated in a standard specification or is configured by a network device.

The at least two candidate channel access types include at least one of a type1 channel access type with the highest priority, a type2 channel access type, a type1 channel access type with the highest priority with directional channel access, a type2 directional channel access type, and bypassing channel detection.

The above mainly describes the solutions of the present disclosure from a terminal device side, and the following provides a further description from a network device side.

A network device may send configuration information to a terminal device, so that the terminal device determines a target channel access type according to the configuration information, where the target channel access type is a channel access type used by the terminal device to transmit a PRACH on an unlicensed carrier.

The configuration information may be the target channel access type, which may include at least one of a type1 channel access type with the highest priority, a type2 channel access type, a type1 channel access type with the highest priority with directional channel access, a type2 directional channel access type, and bypassing channel detection.

Alternatively, the configuration information may be a correspondence between at least two candidate channel access types and a priority of a service triggering the PRACH to be sent, so that the terminal device determines the target channel access type according to the priority of the service triggering the PRACH to be sent, where the target channel access type is one of the at least two candidate channel access types. The correspondence may be a one-to-one correspondence or may not be a one-to-one correspondence.

The at least two candidate channel access types include at least one of a type1 channel access type with the highest priority, a type2 channel access type, a type1 channel access type with the highest priority with directional channel access, a type2 directional channel access type, and bypassing channel detection.

A random access procedure corresponding to the PRACH may be a contention-based random access procedure, that is, a CB-RACH procedure, or may be a contention-free random access procedure, that is, a CF-RACH procedure. The foregoing operation of the network device may be applicable to both the contention-based random access procedure and the contention-free random access procedure.

In addition, when the random access procedure corresponding to the PRACH is the contention-free random access procedure, the network device may further send first indication information to the terminal device by using physical layer signaling, so that the terminal device determines the target channel access type according to the first indication information, where the target channel access type is a channel access type used by the terminal device to transmit the PRACH on the unlicensed carrier.

The first indication information may directly indicate the target channel access type or may indicate a service priority or the like, so that the terminal device determines the target channel access type according to the service priority or the like.

In addition, the target channel access type indicated by the first indication information may be determined by the network device according to a priority of a service triggering the PRACH to be sent, or according to whether a target time domain resource belongs to a shared COT.

The network device may determine the target channel access type according to the priority of the service triggering the PRACH to be sent, where the target channel access type is one of at least two candidate channel access types, and the at least two candidate channel access types correspond to the priority of the service triggering the PRACH to be sent.

The at least two candidate channel access types may include at least one of a type1 channel access type with the highest priority, a type2 channel access type, a type1 channel access type with the highest priority with directional channel access, a type2 directional channel access type, and bypassing channel detection.

For example, when a service with the highest priority triggers the PRACH to be sent, a corresponding channel access type may be the type2 channel access type.

The network device may alternatively determine the target channel access type according to whether a target time domain resource belongs to a shared COT.

The target channel access type may include at least one of a type1 channel access type with the highest priority, a type2 channel access type, a type1 channel access type with the highest priority with directional channel access, a type2 directional channel access type, and bypassing channel detection.

For example, if the network device determines that the target time domain resource belongs to the shared COT, the type2 channel access type may be used as the target channel access type; otherwise, the type1 channel access type with the highest priority may be used as the target channel access type.

The first indication information may be further used for determining at least one of the following information: a start location of the PRACH, an end location of the PRACH, a transmit beam identifier corresponding to the PRACH, and a receive beam identifier corresponding to the PRACH, in addition to indicating the target channel access type and the like.

In the foregoing method embodiments, the description of each embodiment has respective focuses. For a part that is not described in detail in an embodiment, reference may be made to related descriptions in other embodiments.

In conclusion, by using the solutions described in the method embodiments, the PRACH can be sent correctly according to a corresponding channel access type, thereby improving system performance.

The above describes the method embodiments, and the following further describes the solutions of the present disclosure by using apparatus embodiments.

Figure 3:
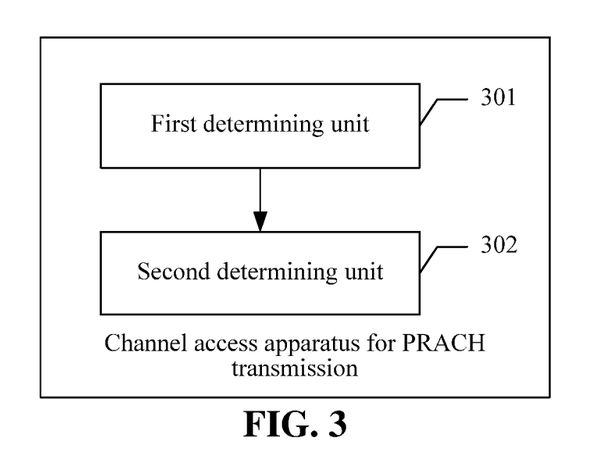
FIG. 3 is a first schematic block diagram of a channel access apparatus for PRACH transmission according to an embodiment of the present disclosure.

FIG. 3 is a first schematic block diagram of a channel access apparatus for PRACH transmission according to an embodiment of the present disclosure. As shown in FIG. 3, the apparatus includes a first determining unit 301 and a second determining unit 302.

The first determining unit 301 is configured to determine a target channel access type, where the target channel access type is a channel access type used by a terminal device to transmit a PRACH on an unlicensed carrier.

The second determining unit 302 is configured to determine, according to the target channel access type, whether a target time domain resource is available, where the target time domain resource is a time domain resource used by the terminal device to send the PRACH.

The first determining unit 301 may determine the target channel access type according to a standard specification, or may determine the target channel access type according to a configuration by a network device, or may determine the target channel access type according to the target time domain resource.

When determining the target channel access type according to the target time domain resource, the first determining unit 301 may determine the target channel access type according to whether the target time domain resource belongs to a shared COT.

The target channel access type may include at least one of a type1 channel access type with the highest priority, a type2 channel access type, a type1 channel access type with the highest priority with directional channel access, a type2 directional channel access type, and bypassing channel detection.

In addition, the first determining unit 301 may alternatively determine the target channel access type according to a priority of a service triggering the PRACH to be sent, where the target channel access type is one of at least two candidate channel access types, and the at least two candidate channel access types correspond to the priority of the service triggering the PRACH to be sent.

A correspondence between the at least two candidate channel access types and the priority of the service triggering the PRACH to be sent is stipulated in a standard specification or is configured by a network device.

The at least two candidate channel access types include at least one of a type1 channel access type with the highest priority, a type2 channel access type, a type1 channel access type with the highest priority with directional channel access, a type2 directional channel access type, and bypassing channel detection.

A random access procedure corresponding to the PRACH is a contention-based random access procedure or a contention-free random access procedure.

The first determining unit 301 may alternatively determine the target channel access type according to a random access procedure corresponding to the PRACH, where the random access procedure includes a contention-based random access procedure and a contention-free random access procedure.

When the random access procedure corresponding to the PRACH is the contention-free random access procedure, the first determining unit 301 may determine the target channel access type according to the first indication information, where the first indication information is sent to the terminal device by a network device by using physical layer signaling.

The target channel access type indicated by the first indication information is determined by the network device according to a priority of a service triggering the PRACH to be sent, or according to whether the target time domain resource belongs to a shared COT.

The first indication information may be further used for determining at least one of the following information: a start location of the PRACH, an end location of the PRACH, a transmit beam identifier corresponding to the PRACH, and a receive beam identifier corresponding to the PRACH.

When the random access procedure corresponding to the PRACH is the contention-based random access procedure, the first determining unit 301 may determine the target channel access type in the following manner: determining the target channel access type according to a standard specification, or determining the target channel access type according to a configuration by a network device, or determining the target channel access type according to the target time domain resource.

Determining the target channel access type according to the target time domain resource may include determining the target channel access type according to whether the target time domain resource belongs to a shared COT.

The target channel access type includes at least one of a type1 channel access type with the highest priority, a type2 channel access type, a type1 channel access type with the highest priority with directional channel access, a type2 directional channel access type, and bypassing channel detection.

In addition, the first determining unit 301 may alternatively determine the target channel access type in the following manner: determining the target channel access type according to a priority of a service triggering the PRACH to be sent, where the target channel access type is one of at least two candidate channel access types, and the at least two candidate channel access types correspond to the priority of the service triggering the PRACH to be sent.

A correspondence between the at least two candidate channel access types and the priority of the service triggering the PRACH to be sent is stipulated in a standard specification or is configured by a network device.

The at least two candidate channel access types include at least one of a type1 channel access type with the highest priority, a type2 channel access type, a type1 channel access type with the highest priority with directional channel access, a type2 directional channel access type, and bypassing channel detection.

Figure 4:
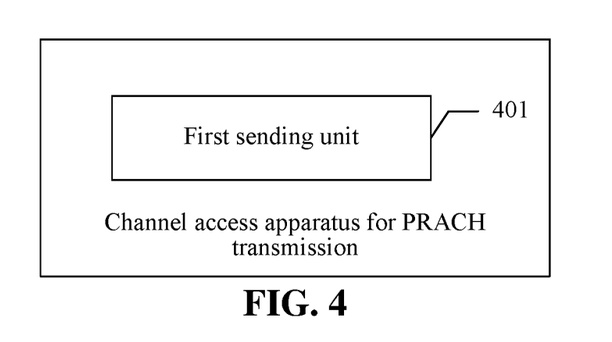
FIG. 4 is a second schematic block diagram of a channel access apparatus for PRACH transmission according to an embodiment of the present disclosure.

FIG. 4 is a second schematic block diagram of a channel access apparatus for PRACH transmission according to an embodiment of the present disclosure. As shown in FIG. 4, the apparatus includes a first sending unit 401.

The first sending unit 401 is configured to send configuration information to a terminal device, so that the terminal device determines a target channel access type according to the configuration information, where the target channel access type is a channel access type used by the terminal device to transmit the PRACH on an unlicensed carrier.

The configuration information may be the target channel access type.

Alternatively, the configuration information may be a correspondence between at least two candidate channel access types and a priority of a service triggering the PRACH to be sent, so that the terminal device determines the target channel access type according to the priority of the service triggering the PRACH to be sent, where the target channel access type is one of the at least two candidate channel access types.

Figure 5:
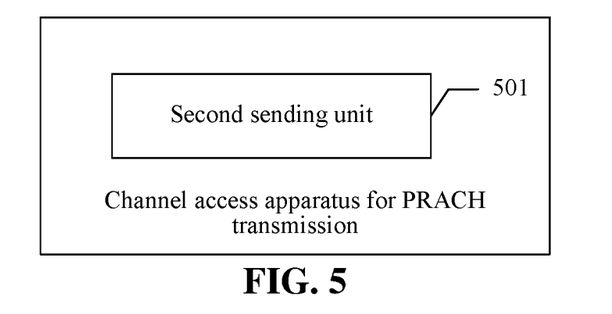
FIG. 5 is a third schematic block diagram of a channel access apparatus for PRACH transmission according to an embodiment of the present disclosure.

FIG. 5 is a third schematic block diagram of a channel access apparatus for PRACH transmission according to an embodiment of the present disclosure. As shown in FIG. 5, the apparatus includes a second sending unit 501.

The second sending unit 501 is configured to send first indication information to a terminal device by using physical layer signaling when a random access procedure corresponding to the PRACH is a contention-free random access procedure, so that the terminal device determines a target channel access type according to the first indication information, where the target channel access type is a channel access type used by the terminal device to transmit the PRACH on an unlicensed carrier.

The target channel access type indicated by the first indication information is determined according to a priority of a service triggering the PRACH to be sent, or according to whether a target time domain resource belongs to a shared COT.

In addition, the first indication information may be further used for determining at least one of the following information: a start location of the PRACH, an end location of the PRACH, a transmit beam identifier corresponding to the PRACH, and a receive beam identifier corresponding to the PRACH.

For specific work procedures of the apparatus embodiments shown in FIG. 3, FIG. 4, and FIG. 5, refer to related descriptions in the foregoing method embodiments. Details are not described herein again.

Figure 6:
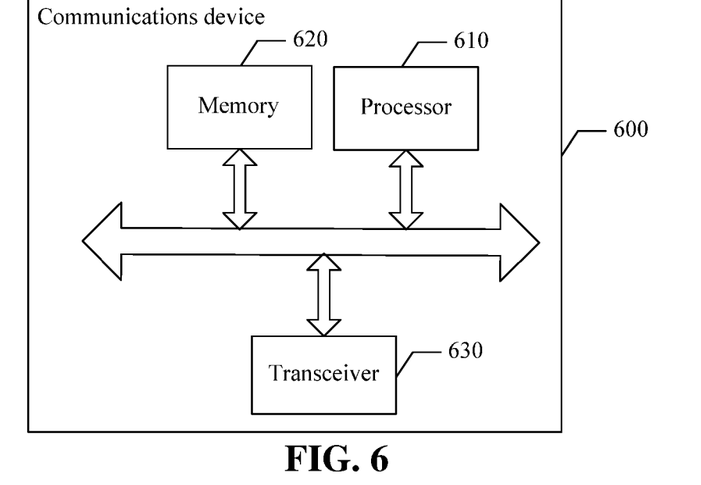
FIG. 6 is a schematic structural diagram of a communications device 600 according to an embodiment of the present disclosure.

FIG. 6 is a schematic structural diagram of a communications device 600 according to an embodiment of the present disclosure. The communications device 600 shown in FIG. 6 includes a processor 610. The processor 610 may invoke a computer program from a memory 620 and run the computer program, to implement the method in the embodiments of the present disclosure.

Optionally, as shown in FIG. 6, the communications device 600 may further include the memory 620. The processor 610 may invoke the computer program from the memory 620 and run the computer program, to implement the method in the embodiments of the present disclosure.

The memory 620 may be a component independent of the processor 610 or may be integrated into the processor 610.

Optionally, as shown in FIG. 6, the communications device 600 may further include a transceiver 630. The processor 610 may control the transceiver 630 to communicate with another device. Specifically, the transceiver 630 may send information or data to the another device or receive information or data sent by the another device.

The transceiver 630 may include a transmitter and a receiver. The transceiver 630 may further include an antenna, and there may be one or more antennas.

Optionally, the communications device 600 may be specifically a network device in the embodiments of the present disclosure, and the communications device 600 may implement corresponding procedures implemented by the network device in the methods in the embodiments of the present disclosure. For brevity, details are not described herein again.

Optionally, the communications device 600 may be specifically a mobile terminal/terminal device in the embodiments of the present disclosure, and the communications device 600 may implement corresponding procedures implemented by the mobile terminal/terminal device in the methods in the embodiments of the present disclosure. For brevity, details are not described herein again.

Figure 7:
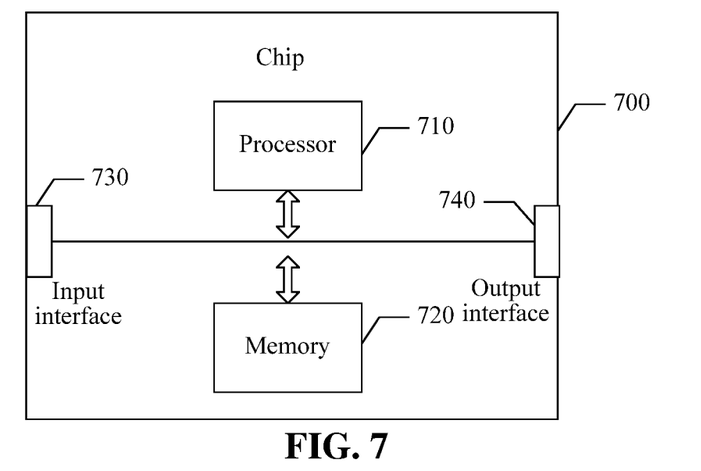
FIG. 7 is a schematic structural diagram of a chip according to an embodiment of the present disclosure.

FIG. 7 is a schematic structural diagram of a chip according to an embodiment of the present disclosure. The chip 700 shown in FIG. 7 includes a processor 710. The processor 710 may invoke a computer program from a memory and run the computer program, to implement the method in the embodiments of the present disclosure.

Optionally, as shown in FIG. 7, the chip 700 may further include a memory 720. The processor 710 may invoke the computer program from the memory 720 and run the computer program, to implement the method in the embodiments of the present disclosure.

The memory 720 may be a component independent of the processor 710 or may be integrated into the processor 710.

Optionally, the chip 700 may further include an input interface 730. The processor 710 may control the input interface 730 to communicate with another device or chip, and specifically, may obtain information or data sent by the another device or chip.

Optionally, the chip 700 may further include an output interface 740. The processor 710 may control the output interface 740 to communicate with another device or chip, and specifically, may output information or data to the another device or chip.

Optionally, the chip may be applied to the network device in the embodiments of the present disclosure, and the chip can implement corresponding procedures implemented by the network device in the methods in the embodiments of the present disclosure. For brevity, details are not described herein again.

Optionally, the chip may be applied to the mobile terminal/terminal device in the embodiments of the present disclosure, and the chip can implement corresponding procedures implemented by the mobile terminal/terminal device in the methods in the embodiments of the present disclosure. For brevity, details are not described herein again It should be noted that the chip mentioned in the embodiments of the present disclosure may also be referred to as a system-level chip, a system chip, a chip system, a system on chip, or the like.

Figure 8:
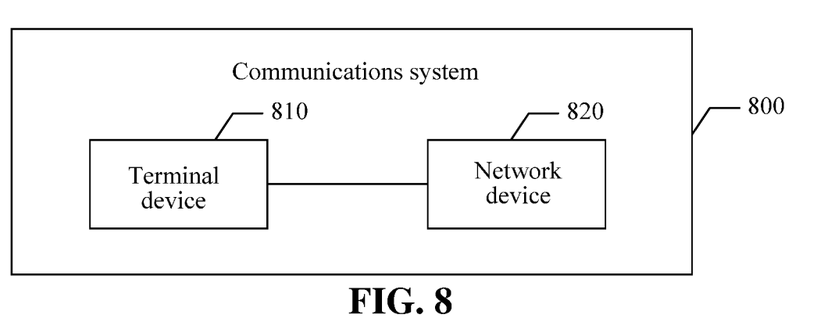
FIG. 8 is a schematic block diagram of a communications system 800 according to an embodiment of the present disclosure.

FIG. 8 is a schematic block diagram of a communications system 800 according to an embodiment of the present disclosure. As shown in FIG. 8, the communications system 800 includes a terminal device 810 and a network device 820

The terminal device 810 may be configured to implement corresponding functions implemented by the terminal device in the foregoing method, and the network device 820 may be configured to implement corresponding functions implemented by the network device in the foregoing method. For brevity, details are not described herein again.

It should be understood that the processor of the embodiments of the present disclosure may be an integrated circuit chip and has a signal processing capability. In an implementation process, steps in the foregoing method embodiments may be completed by using a hardware integrated logical circuit in the processor, or by using instructions in the form of software. The processor may be a general-purpose processor, a digital signal processor (DSP), an application-specific integrated circuit (ASIC), a field-programmable gate array (FPGA) or another programmable logic device, a discrete gate or transistor logic device, or a discrete hardware component. The methods, the steps, and logical block diagrams that are disclosed in the embodiments of the present disclosure may be implemented or performed. The general-purpose processor may be a microprocessor, or the processor may be any conventional processor or the like. Steps of the methods disclosed with reference to the embodiments of the present disclosure may be directly performed and accomplished by using a hardware decoding processor or may be performed and accomplished by using a combination of hardware and software modules in the decoding processor. The software modules may be located in a mature storage medium in the field, for example, a random access memory (RAM), a flash memory, a read-only memory (ROM), a programmable ROM (PROM), an electrically erasable programmable memory, or a register. The storage medium is located in the memory, and the processor reads the information in the memory and completes the steps in the foregoing methods in combination with hardware thereof.

It may be understood that the memory in the embodiments of the present disclosure may be a volatile memory or a non-volatile memory or may include a volatile memory and a nonvolatile memory. The non-volatile memory may be a ROM, a PROM, an erasable PROM (EPROM), an electrically EPROM (EEPROM) or a flash memory. The volatile memory may be a RAM, used as an external cache. It is described as an example but not a limitation, many forms of RAMs, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct Rambus RAM (DR RAM), may be used. It should be noted that the memory of the system and the method described in this specification includes, but is not limited to, these and any other suitable types of memories.

An embodiment of the present disclosure further provides a computer-readable storage medium, configured to store a computer program.

Optionally, the computer-readable storage medium may be applied to the network device in the embodiments of the present disclosure, and the computer program may implement corresponding procedures implemented by the network device in the methods in the embodiments of the present disclosure. For brevity, details are not described herein again.

Optionally, the computer-readable storage medium may be applied to the mobile terminal/terminal device in the embodiments of the present disclosure, and the computer program enables a computer to perform corresponding procedures implemented by the mobile terminal/terminal device in the methods in the embodiments of the present disclosure. For brevity, details are not described herein again.

An embodiment of the present disclosure further provides a computer program product, including a computer program instruction.

Optionally, the computer program product may be applied to the network device in the embodiments of the present disclosure, and the computer program instruction enables a computer to perform corresponding procedures implemented by the network device in the methods in the embodiments of the present disclosure. For brevity, details are not described herein again.

Optionally, the computer program product may be applied to the mobile terminal/terminal device in the embodiments of the present disclosure, and the computer program instruction enables a computer to perform corresponding procedures implemented by the mobile terminal/terminal device in the methods in the embodiments of the present disclosure. For brevity, details are not described herein again.

An embodiment of the present disclosure further provides a computer program.

Optionally, the computer program may be applied to the network device in the embodiments of the present disclosure, and the computer program, when running on a computer, enables the computer to perform corresponding procedures implemented by the network device in the methods in the embodiments of the present disclosure. For brevity, details are not described herein again.

Optionally, the computer program may be applied to the mobile terminal/terminal device in the embodiments of the present disclosure, and the computer program, when running on a computer, enables the computer to perform corresponding procedures implemented by the mobile terminal/terminal device in the methods in the embodiments of the present disclosure. For brevity, details are not described herein again.

A person of ordinary skill in the art may be aware that, in combination with the examples described in the embodiments disclosed in this specification, units and algorithm steps may be implemented by using electronic hardware or a combination of computer software and the electronic hardware. Whether the functions are executed by hardware or software depends on particular applications and design constraint conditions of the technical solutions. A person skilled in the art may use different methods to implement the described functions for each particular application, but it should not be considered that the implementation falls outside the scope of the present disclosure.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. Indirect couplings or communication connections between the apparatuses or units may be implemented in electrical, mechanical, or other forms.

The units described as separate parts may or may not be physically separate, and parts displayed as units may or may not be physical units, that is, may be located in one position or may be distributed on a plurality of network units. Some or all of the units may be chosen according to actual needs to achieve the objectives of the solutions of the embodiments.

In addition, function units in the embodiments of the present disclosure may be integrated into one processing unit, or each of the units may exist alone physically, or two or more units are integrated into one unit.

When the functions are implemented in the form of a software functional module and sold or used as an independent product, the functions may be stored in a computer-readable storage medium. Based on such an understanding, the technical solutions of the present disclosure essentially, or the part contributing to the related art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program codes, such as a USB flash drive, a removable hard disk, a ROM, a RAM, a magnetic disk, or an optical disc.

The foregoing descriptions are merely specific implementations of the present disclosure but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for performing physical random access procedure, applied in shared spectrum, comprising:
   obtaining, by a terminal device, a target channel access type from a network device, wherein the target channel access type comprises a Type 1 channel access or a Type 2 channel access; and
   determining, by the terminal device according to the target channel access type, an availability of a target time domain resource, wherein the target time domain resource is a time domain resource used by the terminal device to perform transmission of a physical random access channel (PRACH),
   wherein the obtaining, by the terminal device, the target channel access type comprises: if the target time domain resource belongs to a shared channel occupancy time, obtaining, by the terminal device the target channel access type comprising the Type 2 channel access; or if the target time domain resource does not belong to a shared channel occupancy time, obtaining, by the terminal device the target channel access type comprising the Type 1 channel access, and
   wherein the shared channel occupancy time is shared by the network device.

2. The method according to claim 1, wherein the target channel access type obtained by the terminal device according to a specification or the target time domain resource comprises the Type 1 channel access.

3. The method according to claim 2, wherein the Type 1 channel access has a smallest value of channel access priority class.

4. The method according to claim 3, wherein if the target channel access type obtained by the terminal device according to a specification is the Type 1 channel access that has the smallest value of channel access priority class, the method further comprises:
   if the target time domain resource belongs to a shared channel occupancy time, switching the target channel access type from the Type 1 channel access that has the smallest value of channel access priority class to the Type 2 channel access.

5. The method according to claim 4, wherein if the target time domain resource does not belong to a shared channel occupancy time, determining, by the terminal device, the target channel access type is the Type 1 channel access that has the smallest value of channel access priority class.

6. The method according to claim 1, wherein the terminal device determining the availability of a target time domain resource according to the target channel access type comprises:
   if the target channel access type is the Type 1 channel access, the terminal device performs channel sensing based on a contention window with parameters corresponding to Type 1 channel access that has the smallest value of channel access priority class; or
   if the target channel access type is the Type 2 channel access, the terminal device performs channel sensing with a deterministic sensing duration of 25 microseconds.

7. The method according to claim 1, wherein the random access procedure corresponding to the PRACH comprises a contention-based random access procedure and a contention-free random access procedure.

8. The method according to claim 1, wherein the random access procedure is a contention-free random access procedure, and the method further comprises determining, by the terminal device, the target channel access type according to first indication information, wherein the first indication information is sent by a network device via signaling of a physical layer.

9. A method for random access, applied in shared spectrum, comprising:
sending, by a network device, first indication information to a terminal device via signaling of a physical layer when a random access procedure corresponding to a physical random access channel (PRACH) is a contention-free random access procedure, to indicate the terminal device to determine, according to the first indication information, a target channel access type for the terminal device to transmit the PRACH on a carrier of a shared spectrum,
wherein indicating the terminal device to determine, according to the first indication information, a target channel access type comprises: if the target time domain resource belongs to a shared channel occupancy time, indicating the terminal device to obtain the target channel access type comprising the Type 2 channel access; or if the target time domain resource does not belong to a shared channel occupancy time, indicating the terminal device to obtain the target channel access type comprising the Type 1 channel access, and
wherein the shared channel occupancy time is shared by the network device.

10. The method according to claim 9, wherein
the target channel access type indicated by the first indication information is determined by the network device according to a priority of a service triggering the PRACH to be sent; or
the target channel access type indicated by the first indication information is determined by the network device according to whether a target time domain resource belongs to a shared channel occupancy time (COT).

11. An apparatus for random access, applied in shared spectrum, comprising a processor and a memory, wherein the memory is configured to store a computer program, and the processor is configured to invoke and run the computer program stored in the memory, to perform:
obtaining, by a terminal device, a target channel access type from a network device, wherein the target channel access type comprises a Type 1 channel access or a Type 2 channel access; and
determining, by the terminal device according to the target channel access type, an availability of a target time domain resource, wherein the target time domain resource is a time domain resource used by the terminal device to perform transmission of a physical random access channel (PRACH),
wherein obtaining, by the terminal device, the target channel access type comprises: if the target time domain resource belongs to a shared channel occupancy time, obtaining, by the terminal device the target channel access type comprising the Type 2 channel access; or if the target time domain resource does not belong to a shared channel occupancy time, obtaining, by the terminal device the target channel access type comprising the Type 1 channel access, and
wherein the shared channel occupancy time is shared by the network device.

12. The apparatus according to claim 11, wherein the target channel access type obtained by the terminal device according to a specification or the target time domain resource comprises the Type 1 channel access.

13. The apparatus according to claim 12, wherein the Type 1 channel access has a smallest value of channel access priority class.

14. The apparatus according to claim 12, wherein the processor is configured to invoke and run the computer program stored in the memory to further perform:
if the target time domain resource belongs to a shared channel occupancy time, obtaining, by the terminal device the target channel access type, which comprises the Type 2 channel access; or
if the target time domain resource does not belong to a shared channel occupancy time, obtaining, by the terminal device, the target channel access type, which comprises the Type 1 channel access.

15. The apparatus according to claim 14, wherein the shared channel occupancy time is shared by a network device or the terminal device.

16. The apparatus according to claim 13, wherein, in a case where the target channel access type obtained by the terminal device according to a specification is the Type 1 channel access that has the smallest value of channel access priority class, the processor is configured to invoke and run the computer program stored in the memory, to further perform, if the target time domain resource belongs to a shared channel occupancy time, switching the target channel access type from the Type 1 channel access that has the smallest value of channel access priority class to the Type 2 channel access.

17. The apparatus according to claim 16, wherein if the target time domain resource does not belong to a shared channel occupancy time, determining, by the terminal device, the target channel access type is the Type 1 channel access that has the smallest value of channel access priority class.

18. An apparatus for random access, applied in shared spectrum, comprising a processor and a memory, wherein the memory is configured to store a computer program, and the processor is configured to invoke and run the computer program stored in the memory to perform:
sending, by a network device, first indication information to a terminal device via signaling of a physical layer when a random access procedure corresponding to a physical random access channel (PRACH) is a contention-free random access procedure, to indicate the terminal device to determine, according to the first indication information, a target channel access type for the terminal device to transmit the PRACH on a carrier of a shared spectrum,
wherein indicating the terminal device to determine, according to the first indication information, a target channel access type comprises: if the target time domain resource belongs to a shared channel occupancy time, indicating the terminal device to obtain the target channel access type comprising the Type 2 channel access; or if the target time domain resource does not belong to a shared channel occupancy time, indicating the terminal device to obtain the target channel access type comprising the Type 1 channel access, and
wherein the shared channel occupancy time is shared by the network device.

* * * * *